United States Patent
Crewe

[11] 3,863,732
[45] Feb. 4, 1975

[54] FLEXIBLE SKIRT ASSEMBLIES FOR FLUID CUSHION SUPPORTED VEHICLES

[75] Inventor: Peter Rowland Crewe, Newport, Isle of Wight, England

[73] Assignee: British Hovercraft Corporation Limited, Westland Works, Yeouil, Somerset, England

[22] Filed: Jan. 9, 1973

[21] Appl. No.: 322,178

[30] Foreign Application Priority Data
Jan. 12, 1972  Great Britain ...................... 1439/72

[52] U.S. Cl. .............................. 180/124, 180/128
[51] Int. Cl. ............................................. B60v 1/16
[58] Field of Search ........... 180/116, 117, 120, 121, 180/124, 126, 127, 128

[56]  References Cited
UNITED STATES PATENTS

| | | | |
|---|---|---|---|
| 3,291,240 | 12/1966 | Driver | 180/128 |
| 3,306,388 | 2/1967 | Jones | 180/128 |
| 3,478,836 | 4/1967 | Eckered et al. | 180/128 |
| 3,536,156 | 10/1970 | Crago | 180/124 |
| 3,621,932 | 11/1971 | Tattersall | 180/126 |

Primary Examiner—Kenneth H. Betts
Assistant Examiner—Jack D. Rubenstein
Attorney, Agent, or Firm—Larson, Taylor & Hinds

[57]  ABSTRACT

Part of the cushion sealing means of a fluid cushion supported vehicle is formed by a flexible skirt assembly which includes a flexible impermeable sealing curtain having one edge attached to the underside of the vehicle. In operation of the vehicle the sealing curtain is supported against cushion pressure by a plurality of arcuate inflatable flexible tubular members which are attached to the vehicle, and by a horizontal inflatable flexible cylindrical member which is supported by the arcuate members.

13 Claims, 7 Drawing Figures

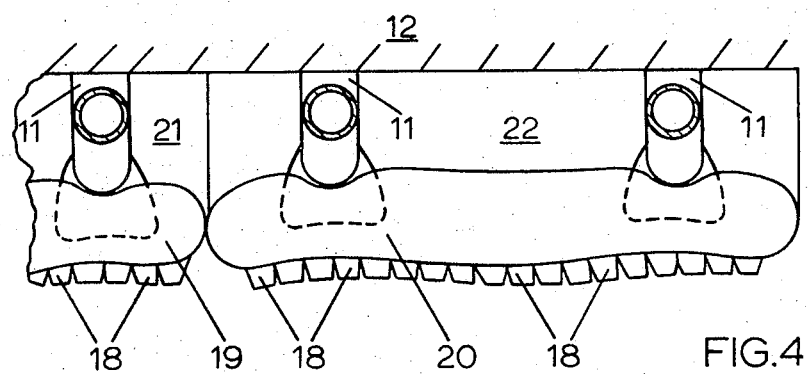
FIG.4
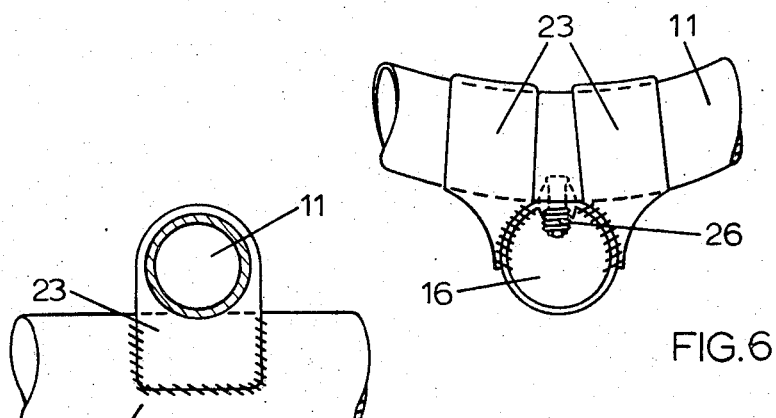
FIG.5
FIG.6
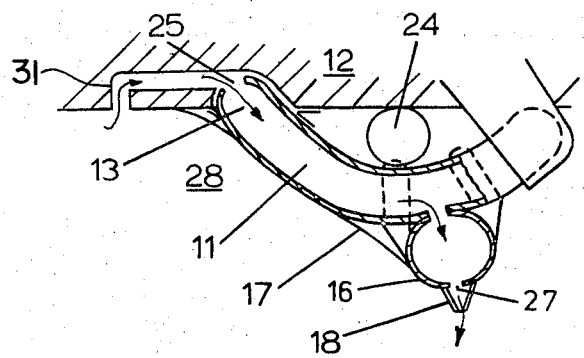
FIG.7

FLEXIBLE SKIRT ASSEMBLIES FOR FLUID CUSHION SUPPORTED VEHICLES

THIS INVENTION is concerned with flexible skirt assemblies for vehicles which receive support from at least one pressurized fluid cushion. More particularly it concerns those parts of flexible skirt assemblies situated at the rear of the vehicle.

According to the invention I provide a flexible skirt assembly for forming part of the cushion sealing means of a vehicle which receives support from at least one pressurized fluid cushion, wherein the skirt assembly includes a horizontal inflatable flexible cylindrical member which in operation of the vehicle is supported below rigid structure of the vehicle by arcuate inflatable flexible tubular members, and a flexible impermeable sealing curtain which in operation has one edge attached to the underside of rigid structure of the vehicle and is supported against forces generated by fluid cushion pressure by the horizontal inflatable flexible cylindrical member and the arcuate inflatable flexible tubular members.

The horizontal inflated flexible cylindrical member may be protected by cones of flexible impermeable material depending from its lower parts.

The term "fluid" is used to indicate that any suitable gas or mixture of gases, for example, air, may be used to form the vehicle support cushion which can be supplemented by the addition of a liquid such as water.

The invention will now be described, by way of example, with reference to the accompanying drawings, in which:-

Figure 1:
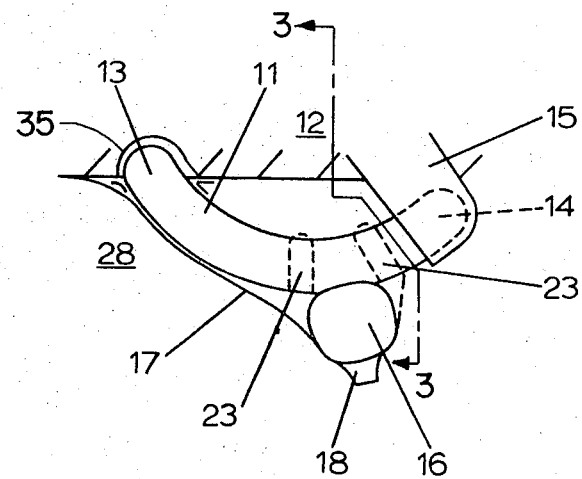
FIG. 1 is a side elevation of a flexible skirt assembly according to one embodiment of the invention, shown cooperating with part of the rigid structure forming the underside of an air cushion vehicle.
Figure 3:
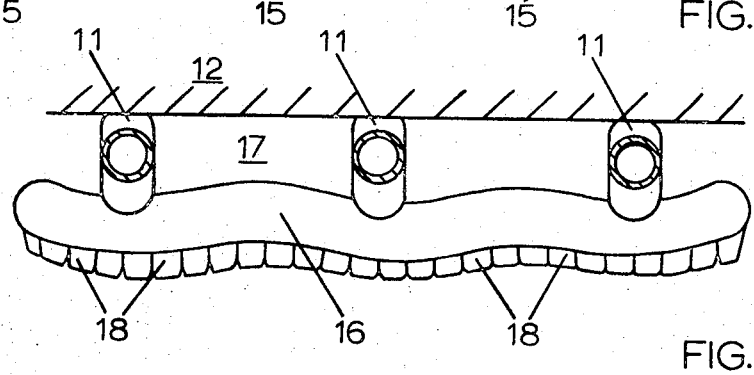

FIG. 3 is a section view along line 3—3 of FIG. 1, with some parts removed for clarity, FIG. 4 is a similar section to that shown in FIG. 3, but with the horizontal cylindrical member modified in accordance with a second embodiment of the invention, FIG. 5 illustrates one method of joining horizontal inflated flexible cylindrical members and arcuate inflated flexible tubular members, FIG. 6 illustrates another method of joining and a method of transferring fluid between horizontal flexible cylindrical members and arcuate inflated flexible tubular members, and FIG. 7 is a part sectional side elevation illustrating a modified form of the invention.

Figure 2:
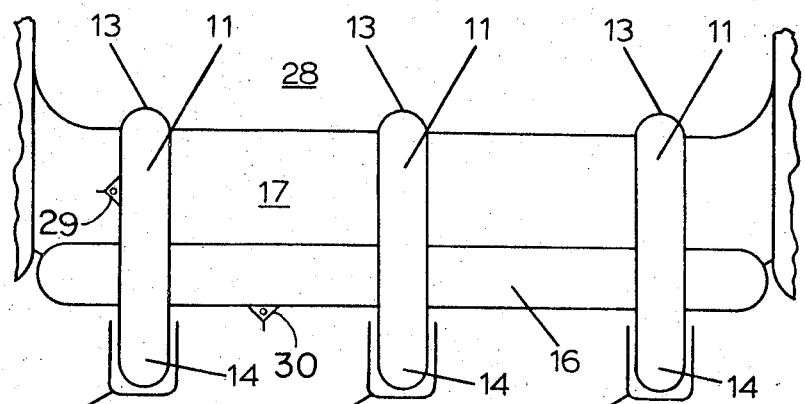
FIG. 2 is a plan of the flexible skirt assembly illustrated in FIG. 1.

Referring first to FIGS. 1, 2 and 3 of the drawings, the cushion sealing means for an air cushion vehicle (only a portion of the rigid structure thereof being shown) includes, in accordance with one embodiment, a flexible skirt assembly comprising a plurality of arcuate inflatable flexible tubular members 11 arranged beneath the rigid structure 12 at the aft end of the vehicle. The tubular members 11 are arranged so that their longitudinal axes are substantially parallel to the longitudinal axis of the vehicle. The members 11 are inflated by way of non-return valves, one of which is shown schematically at 29, and are fabricated so that when inflated they assume an arcuate shape convex towards the surface above which the vehicle is travelling. The forward ends 13 of the members 11 are located in fixed housings 35 in the structure 12 of the vehicle. The rear ends 14 of the members 11 are carried in flexible housings 15 arranged to allow the rear ends 14 to move aft as the member 11 is straightened.

Attached to the arcuate inflatable flexible tubular members 11 on their undersides is a horizontal inflatable flexible cylindrical member 16 which extends across the width of the cushion area between the cushion sealing means at the sides of the vehicle. The horizontal member 16 is of the sealed bag type and is inflated as necessary by way of a non-return valve 30.

In this arrangement the horizontal member 16 is supported beneath the structure 12 of the vehicle by curved pneumatic springs constituted by the arcuate members 11.

A flexible curtain 17 comprising a sheet of flexible impermeable material with an upper edge attached to the structure 12 of the vehicle and its side edges turned forward and hermetically attached to the cushion sealing means at the sides of the vehicle is supported by the arcuate members 11 and the horizontal member 16, and forms the cushion seal at the back of the vehicle. If desirable, the sealing curtain 17 may be reinforced with stiffeners.

To prevent wear on the lower part of the horizontal member 16 waster cones 18 may be attached thereto. The cones 18 are made of flexible impermeable material which has sufficient stiffness so that the cones retain their shape without the need for inflation.

In a second embodiment of the invention the horizontal inflatable flexible cylindrical member 16 is divided into a plurality of discrete parts. FIG. 4 illustrates two such parts 19 and 20. Similarly, the flexible impermeable sealing curtain may also be divided into a plurality of parts 21 and 22 having sufficient overlap to provide an efficient cushion seal. In this embodiment the division of the units stretching across the rear of the vehicle provides greater flexibility of the flexible skirt assembly without detracting from its efficiency as a cushion seal. The lower parts of the horizontal members 19 and 20 may be protected by waster cones 18, as in the first embodiment.

FIGS. 5 and 6 illustrate how the arcuate members 11 and the horizontal members 16 are joined together by straps 23 bonded to the horizontal members 16 and of a size to constrict the inflated arcuate members 11. With this arrangement when the rear ends 14 of the arcuate members 11 are removed from their housing 15 the horizontal members 16 may be slid off rearwards when the arcuate members 11 are deflated.

Preferably the horizontal members 16 are set aft of the centre of the curve of the arcuate members 11 so that the waster cones 18 are angled back from the vertical.

In a modified form of the invention (FIG. 7) an inflated pillow 24 which consists of a cylinder of flexible impermeable material is interposed between the arcuate members 11 and the rigid structure 12 of the vehicle. This arrangement provides a multi-stiffness spring arrangement in which the stiffness of the system to vertical displacement and to longitudinal displacement increases upwards and aft respectively.

In this modified form of the invention the arcuate members 11 and the horizontal members 16 are inflated by cushion air. The cushion air enters a forward end 13 of an arcuate member 11 from a duct (not shown) in the rigid structure 12 of the vehicle by way of an orifice 25. This air inflates the tubular member 11 and flows by way of a concertinalike connection 26 (FIG. 6) to the horizontal member 16. From the horizontal member 16 the air flows through orifices 27 into the waster cones 18 or other wear-reducing devices and thence to the cushion area 28.

The concertinalike connection 26 may be restricted or valved to provide damping, if this should be desirable.

I claim as my invention:

1. In a vehicle which receives support from at least one pressurized fluid cushion, a flexible skirt assembly for forming part of the cushion sealing means of the vehicle, wherein the skirt assembly includes a horizontal inflatable flexible cylindrical member which in operation of the vehicle is supported below rigid structure of the vehicle by arcuate inflatable flexible tubular members, and a flexible impermeable sealing curtain which in operation has one edge attached to the underside of rigid structure of the vehicle and is supported against forces generated by fluid cushion pressure by the horizontal inflatable flexible cylindrical member and the arcuate inflatable flexible tubular members, said flexible skirt assembly being fitted beneath the vehicle across the aft end so that the arcuate members are substantially parallel to the longitudinal axis of the vehicle.

2. A vehicle as claimed in claim 1, wherein the arcuate members are fabricated so that their arcuate shape is convex towards the surface above which the vehicle is supported.

3. A vehicle as claimed in claim 2, wherein the arcuate members have their forward ends located in fixed housings formed in structure of the vehicle and their rear ends carried in flexible housings attached to the vehicle.

4. A vehicle as claimed in claim 1, wherein the horizontal member is divided into a plurality of discrete parts.

5. A vehicle as claimed in claim 1, wherein the flexible sealing curtain comprises at least one sheet of flexible impermeable material having one edge attached to the vehicle and depending downwardly therefrom.

6. A vehicle as claimed in claim 1, wherein an inflated pillow is interposed between the arcuate members and the vehicle structure.

7. A vehicle as claimed in claim 1, wherein the arcuate members and the horizontal member are inflated by cushion fluid.

8. A vehicle as claimed in claim 1, wherein cones of flexible impermeable material depend downwardly from the horizontal member.

9. In a vehicle which receives support from at least one pressurized fluid cushion, a flexible skirt assembly for forming part of the periphery of the cushion sealing means, said skirt assembly comprising a plurality of relatively elongate tubular members formed of flexible material and inflatable, the tubular members being of arcuate or bowed configuration along their lengths and supported beneath the vehicle in generally horizontal orientations such that they are arcuate or bowed in generally vertical planes, a generally horizontal cylindrical member supported by and beneath said arcuate tubular members so as to be movable upwardly in opposition to, and downwardly under the influence of, the resilient force of said arcuate tubular members, and a flexible impermeable sealing curtain extending at its upper edge along the underside of rigid structure of the vehicle and downwardly along the assembly of tubular and cylindrical members on the air cushion side thereof.

10. Apparatus as claimed in claim 9 wherein said horizontal cylindrical member is inflatable.

11. Apparatus as claimed in claim 9 wherein said arcuate tubular members are suspended by their ends beneath the vehicle so as to be concave upwardly, and wherein said horizontal cylindrical member is coupled to an intermediate portion of each tubular member on the convex side thereof.

12. Apparatus as claimed in claim 11 wherein at least one end of each arcuate tubular member is suspended so as to be movable horizontally upon changes in the curvature of its tubular member.

13. Apparatus as claimed in claim 9 wherein said skirt assembly is fitted beneath the vehicle across the aft end so that the arcuate tubular members are substantially parallel to the longitudinal axis of the vehicle.

* * * * *